W. NEWLIN.
Wheel-Plow.
No. 220,643.    Patented Oct. 14, 1879.
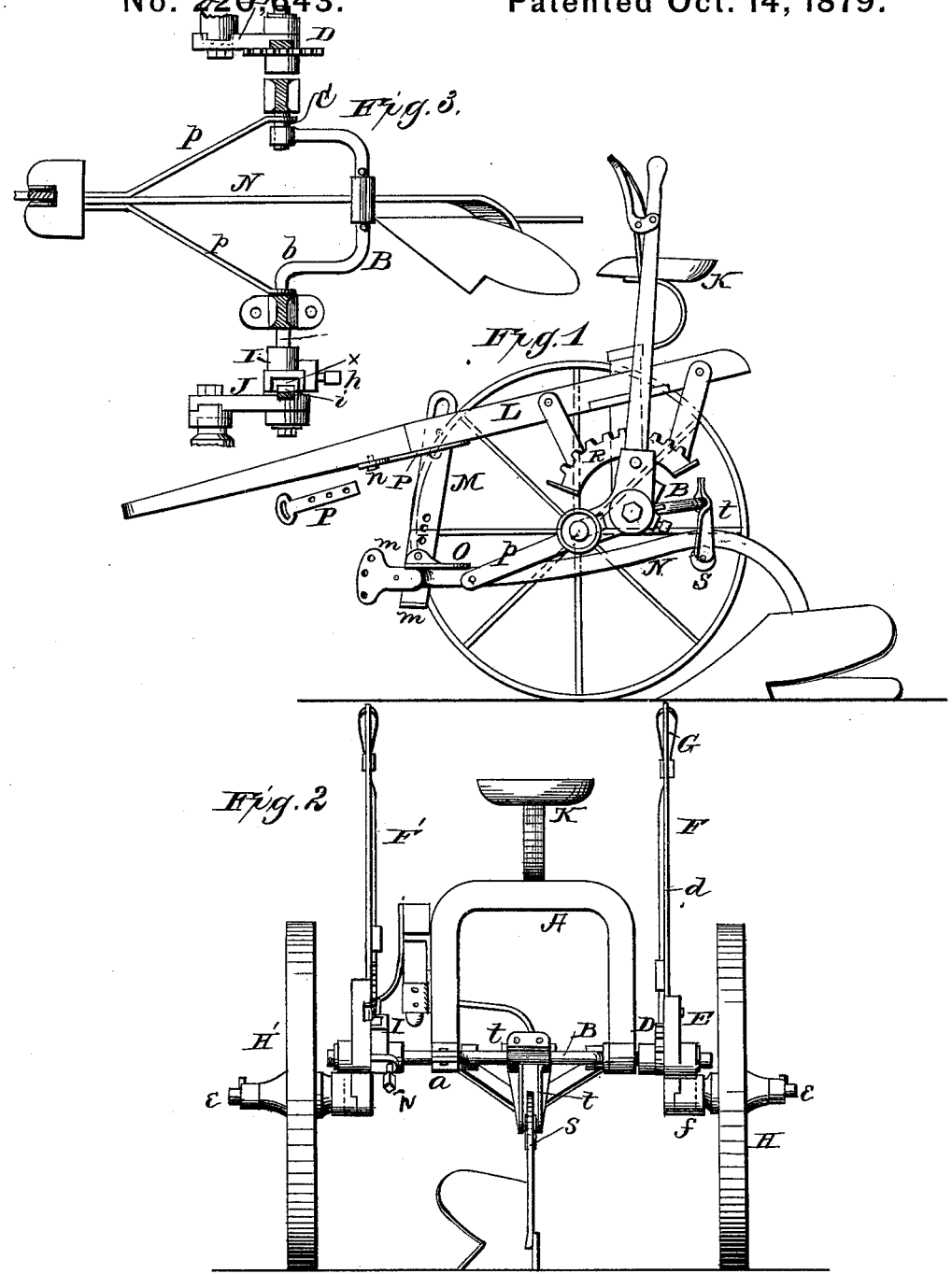
WITNESSES
F. L. Durand
H. A. Toulmin
By
INVENTOR
Wm Newlin
Alexander Mason
ATTORNEYS

UNITED STATES PATENT OFFICE.

WILLIAM NEWLIN, OF ATTICA, INDIANA.

IMPROVEMENT IN WHEEL-PLOWS.

Specification forming part of Letters Patent No. 220,643, dated October 14, 1879; application filed January 14, 1879.

*To all whom it may concern:*

Be it known that I, WILLIAM NEWLIN, of Attica, in the county of Fountain, and in the State of Indiana, have invented certain new and useful Improvements in Wheeled Plows; and do hereby declare that the following is a full, clear, and exact description thereof, reference being had to the accompanying drawings, and to the letters of reference marked thereon, making a part of this specification.

My invention relates to wheel-plows, and has for its object to produce a flexible plow-carriage, so that while the plow is making a level furrow in the bottom, the carriage, by its flexible principle, is left free to accommodate itself to the uneven surface of the ground, or run over any reasonable obstruction without disturbing the even tenor of the plow.

In order to enable others skilled in the art to which my invention appertains to make and use the same, I will now proceed to describe its construction and operation, referring to the annexed drawings, in which—

Figure 1 is a side elevation of a wheeled plow embodying my invention. Fig. 2 is a rear view of the same. Fig. 3 is a plan view of a part thereof.

As a basis for my plow-carriage I use a metallic bow, A, placed in the center of the carriage between the wheels. One end of this bow is simply provided with a hole, and the other end with a box, *a*, for the purpose of receiving the axle-tree B. This is made of round iron in arched form, with a double crank, *b*, at one end. In the other end is formed an eye for the purpose of receiving the extension C of the axle, forming a loose joint in the axle. The axle-extension C is keyed in the hole in the end of the bow A, and projects far enough on the inside thereof to enter the eye in the end of the arched axle. It also extends outward from the bow, and passes through a hubbed rack, D, and crank E, which are secured upon said extension by a plug-tap and washer in the end thereof. The crank E is loose on the axle-extension, and provided at the upper end with a lever, F, to the upper end of which is attached a spring hand-hold, G, with rod *d* extending downward, with bolt at the lower end, passing into the notches of the rack, thereby holding the crank from turning, the hubbed rack D being keyed fast on the axle, all for the purpose of raising and lowering the frame.

In the lower end of the crank is a slot with an adjustable bowl, *f*, and arm *e*, the bowl being provided with a shoulder on the inside, and the arm passing through the bowl and slot, and a nut screwed on the inner end of the arm, by which the bowl and arm are held firmly in position in the slotted end of the crank. On the outer end of the arm *e* is attached the wheel H, by means of an ordinary linchpin. By loosening the nut on the arm the arm and wheel can be easily raised or lowered, for the purpose of facilitating the raising or lowering of the frame in deep plowing, especially upon hill-side land, where other devices have most generally failed. The opposite end of the axle passes through an adjustable hubbed clutch, I, and crank J. The clutch is secured to the axle by means of a set-screw, *h*, and in the outer face of said clutch is a recess, *x*. On the inner side of the crank, and corresponding with the recess *x*, is formed a lug, *i*, protruding into said recess. The lug *i* is made narrower than the recess *x*, for the purpose of obtaining slack, or allowing the crank J to move up or down in opposite directions to the rise or fall of the wheels when passing over uneven ground. These two devices, in combination with the joint in the axle, produce a flexible carriage, thereby leaving the carriage free to accommodate itself to the uneven surface of the ground without disturbing the run of the plow. The lug on the crank and recess in the clutch are also for the purpose of raising the plow out of the ground by the forward movement of the lever; also for the purpose of keeping the plow in the ground. By a reverse motion of the lever the lug *i* is brought in contact with the rear portion of the flange of the recess *x*, by which the arched axle is brought to bear on the plow-beam sufficient, if necessary, to raise the carriage from the ground.

The crank J is slotted and provided with an adjustable arm and wheel, H′, and at the other end with a lever, F′, and hand-hold and rod, the same as described for the crank E on the opposite side of the carriage.

On the top of the bow A, in the middle of the carriage, a seat, K, is placed; and on one side and near the top of the said bow is a flange, to which the tongue or pole L is secured by means of bolts. Forward of the bow a suitable distance is a foot-rest, consisting of a bar, M, with slot in the upper end, secured to the tongue by a bolt, then bent outward and downward, the lower end being brought perpendicularly over the plow-beam and supplied with flanges m at the lower end, against which the plow-beam N rests when in the act of raising the plow, the forward end of said beam being arranged between the foot-rest O and flange m. The bar M is also supplied near the lower end with an adjustable foot-rest, O, which is rendered so by a number of holes formed in the bar, securing the foot-rest to the bar by means of a bolt, so that it can be raised or lowered to suit the length of the operator. The slot in the upper end of the bar is for the purpose of lowering the bar onto the plow-beam in hard stiff soils at a proper depth to prevent it jumping out of the ground.

Forward of the bar M is a round joint in the tongue. An iron plate, P, is secured to the under side of the tongue by means of bolts. At the forward end of the plate is a slot with a bolt, n, passing through it and through the tongue. By loosening the bolt the tongue can be veered either way as it turns on the pivot-bolt near the joint, for the purpose of giving the plow more or less land, as the case may require. At or near the rear end of the tongue are attached suitable downwardly-projecting arms, to which a rack, R, is secured, and so arranged as to come in contact with the bolt in the lever F', above mentioned.

This machine is further provided with two iron straps, p p, one on either side of the plow-beam, the axle passing through their rear ends. Said straps then extend forward, and are bent inward and their front ends pivoted to the plow-beam N. These straps are intended to work loosely on their pivots at both ends, and are for the purpose of drafting the carriage and steadying the plow; also for backing the plow from any obstruction.

On the middle of the arched axle is placed a lifter, consisting of two iron plates, t t, made to encircle the arch at the upper ends, and extending downward below the axle and forming a slot of sufficient width to receive the plow-beam. Under the beam, in said slot, is placed a roller, s, which is intended to assist the operator in raising the plow. As the axle makes part of a circle the roller moves on the under edge of the beam. The lifter also holds the plow in position, in connection with the straps above mentioned, and prevents it from careering either way while in motion.

Having thus fully described my invention, what I claim as new, and desire to secure by Letters Patent, is—

1. In a wheeled plow, the jointed axle B C, in combination with the hubbed clutch I, having recess x, and the crank J, with lug i, substantially as and for the purposes herein set forth.

2. The combination of the axle B, crank E, pivoted thereon and having one arm slotted longitudinally, the bowl f, and wheel-spindle e, adjustable in the slot in the crank-arm, and a lever, dog, and rack for holding the crank in different positions, substantially as set forth.

3. In combination with a two-wheeled plow having the plow-beam suspended below the axle, the slotted bent bar M, provided with the flanges m m and adjustable foot-rest O, and the plow-beam N, with its forward end arranged between the foot-rest O and flange m, substantially as and for the purposes herein set forth.

4. The combination of the bent axle B and clutch I with the movable lock-lever F', having a slotted connection with the clutch, whereby said axle has a limited free movement, substantially as specified.

5. The combination, with the crank B and plow-beam N, of the hanger t, pivoted to the crank and loosely connected with the beam, and the braces p, pivoted at both ends, substantially as specified.

In testimony that I claim the foregoing I have hereunto set my hand this 28th day of November, 1878.

WILLIAM NEWLIN.

Witnesses:
  CHAS. C. BAND,
  CHARLES F. ROBINSON.